(12) United States Patent
Obata

(10) Patent No.: US 9,039,367 B2
(45) Date of Patent: May 26, 2015

(54) PROPELLER WINDMILL FOR SMALL-SIZED POWER GENERATOR

(75) Inventor: Akira Obata, Oita (JP)

(73) Assignee: Educational Foundation Bunri Gakuen, Oita (JP)

( * ) Notice: Subject to any disclaimer, the term of this patent is extended or adjusted under 35 U.S.C. 154(b) by 0 days.

(21) Appl. No.: 14/127,804

(22) PCT Filed: Jun. 30, 2011

(86) PCT No.: PCT/JP2011/065097
§ 371 (c)(1),
(2), (4) Date: Dec. 19, 2013

(87) PCT Pub. No.: WO2013/001647
PCT Pub. Date: Jan. 3, 2013

(65) Prior Publication Data
US 2014/0112782 A1    Apr. 24, 2014

(51) Int. Cl.
*F03D 1/06* (2006.01)
*F03D 7/02* (2006.01)

(52) U.S. Cl.
CPC ............ *F03D 1/06* (2013.01); *F05B 2240/2213* (2013.01); *F05B 2250/61* (2013.01); *F05B 2280/4002* (2013.01); *F05B 2280/4003* (2013.01); *Y02E 10/721* (2013.01); *F16C 2360/31* (2013.01); *F03D 7/0204* (2013.01); *F03D 7/0268* (2013.01)

(58) Field of Classification Search
CPC ....... F03D 1/06; F03D 1/0633; F03D 1/0641; F03D 1/0675; F03D 1/0683; F03D 7/0204; F05B 2240/2213; F05B 2240/311; F05B 2250/61

USPC ........ 416/9, 11, 132 A, 132 B, 135, 175, 203, 416/205, 228, 235, 236 R, 236 A, 240, 241 A
See application file for complete search history.

(56) References Cited

U.S. PATENT DOCUMENTS

| | | | |
|---|---|---|---|
| 8,033,794 B2 * | 10/2011 | Lee | 416/244 R |
| 2005/0084373 A1 | 4/2005 | Suzuki | |
| 2007/0098555 A1 * | 5/2007 | Siegfriedsen | 416/132 B |

FOREIGN PATENT DOCUMENTS

| | | |
|---|---|---|
| EP | 0 066 035 | 12/1982 |
| JP | 25-3964 | 11/1950 |
| JP | 29-8608 | 12/1954 |
| JP | 55-148978 | 11/1980 |
| JP | 57-83672 | 5/1982 |
| JP | 4-103883 | 4/1992 |
| JP | 9-79127 | 3/1997 |
| JP | 2003-56448 | 2/2003 |

(Continued)

*Primary Examiner* — Edward Look
*Assistant Examiner* — Jesse Prager
(74) *Attorney, Agent, or Firm* — Jordan and Hamburg LLP (57) ABSTRACT

Provided is a small-sized propeller windmill which can efficiently generate power even when a wing speed is low, has no possibility that the windmill is broken even when a strong wind blows, can stably ensure a weathercock direction of a base blade, and can suppress an environmental burden, in such a propeller windmill, the blade having a corrugated wing shape is supported in a cantilever manner by way of an elastic body, and the blade and the elastic body are made of paper or plastic. Further, to stably ensure the weathercock. direction of the base blade, a weathercock stabilizing mechanism is arranged behind the base blade.

8 Claims, 9 Drawing Sheets

(56) References Cited

FOREIGN PATENT DOCUMENTS

| JP | 3435540 | 6/2003 |
| JP | 2004-44477 | 2/2004 |
| JP | 2007-138736 | 6/2007 |
| JP | 4533991 | 9/2010 |
| JP | 2011-58483 | 3/2011 |
| WO | WO-2007/017918 | 2/2007 |

* cited by examiner

PROPELLER WINDMILL FOR SMALL-SIZED POWER GENERATOR

BACKGROUND OF THE INVENTION

The present invention relates to a propeller windmill for a small-sized power generator, and more particularly to a small-sized propeller windmill for small-scaled power generation.

In general, a windmill used in wind power generation enables the acquisition of electric power by making use of strong natural energy. On the of hand, it is necessary to for the windmill to take a measure such that a structure or a device which makes the windmill withstand a strong wind or let a strong wind go apart therefrom in a natural environment is added to the windmill. Accordingly, the following various countermeasures against a strong wind have been applied to conventionally known propeller windmills.

For example, patent literature JP-A-2003-56448 discloses the invention where pitch angles of a plurality of blades mounted on a propeller windmill are changed and controlled independently by a mechanical mechanism housed in a hub of the propeller windmill.

On the other hand, since a small-sized propeller is arranged near a ground surface, the pitch-angle changing and controlling mechanism having the complicated constitution described above cannot be incorporated into the inside of the small-sized propeller windmill. Accordingly, a countermeasure against a strong wind or a countermeasure against wind shear is taken by increasing strength of the blades of the windmill and strength of a blade mounting portion.

However, the above-mentioned measures against a strong wind have a drawback that the starting performance and the power generation efficiency of the windmill deteriorate when a wind speed is low.

In view of the above, there has been developed a small-sized propeller windmill which can efficiently generate power ranging from when a wind speed is low to when a strong wind blows, and can also prevent the breaking of the windmill even when a strong wind blows, that is, a PROVEN windmill (see patent literature JP-B-25-3964, patent literature JP-B-29-8608, patent literature JP-A-9-79127, patent literature JP-A-9-79127, and patent literature Japanese Patent No. 3435540).

Further, in a downwind-type small-sized windmill, that is, in a windmill where a generator and windmill blades are arranged on a downstream of a vertical support strut which constitutes a yawing axis, a weathercock stabilizing means which generates a yawing rotational moment is adopted so that the blades are always displaced to a downwind position.

It is found, however, that the above-mentioned structure cannot ensure the sufficient weathercock stability in case of the downwind-type small-sized windmill.

It has been considered in general that, in the downwind-type windmill, provided that a rotational plane of a windmill blade is arranged more on leeward side than a vertical support strut which constitutes a rotational axis in the yaw direction, a rotational front plane of the windmill blade is always displaced to a leeward side due to the positional relationship between the wind-pressure center positioned at the approximately center of the blade rotational plane and the yawing rotational axis. However, according to an experiment which was actually carried out, it is found out that, in a small-sized windmill which has a diameter of rotation of an approximately 50 cm, even when a wind speed is 5 m or below, it is not always the case that a rotational front plane of a windmill blade is displaced to a leeward side and the rotational front plane returns to an original upwind position where the rotational front plane faces a wind.

Figure 12:
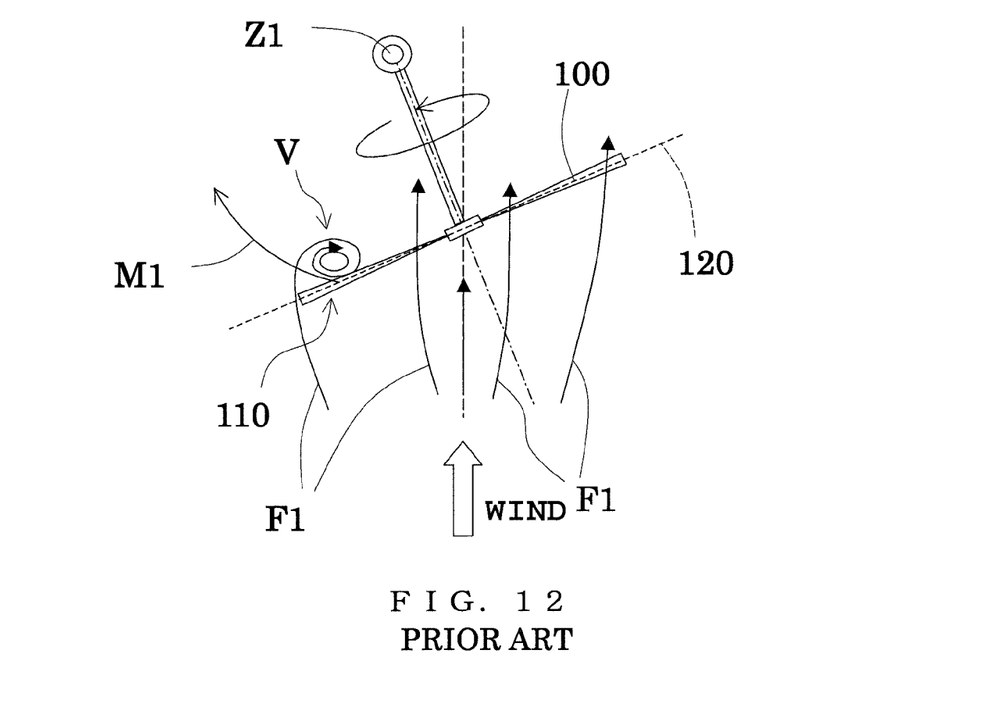
FIG. 12 is an explanatory view of an undesired weathercock stabilizing point in a conventional downwind method.

Such a phenomenon is logically explained in conjunction with FIG. 12. Symbol 100 indicates windmill blades, That is, FIG. 12 is a view for explaining a phenomenon where the downwind-type windmill is stabilized at an upwind position. In FIG. 12, it is estimated that, when a blade rotational plane 120 does not face a wind and has a slight yawing angle about a yawing axis Z1, the blade rotational plane 120 functions as a disk wing so that a vortex V is venerated on a back side of a blade wing end region 110 on a windward side of the blade rotational plane 120 whereby a negative pressure is increased and the negative pressure imparts a moment M1 which returns the blade rotational plane 120 to the direction where the blade rotational plane 120 faces the wind. In the drawing, symbol F1 indicates the flow of air.

Further, in a conventional micro wind power generator, a load applied to windmill blades when a strong wind blows is large and hence, it is necessary to impart the strong structure to the blades per se. It is also necessary to ensure the strong connection between the blades and an input shaft of a generator. Accordingly, the combination of the configuration and structure of the windmill blades with a power generation capacity of the power generator is fixed and limited and hence, it is impossible for the conventional micro wind power generator to change the configuration and the structure of the windmill blade corresponding to an output load.

In general, in designing a windmill, the windmill is designed so as to absorb wind power at maximum. Accordingly, windmill blades are designed such that maximum efficiency is acquired at times where a required torque is outputted at respective different rotational speeds. Accordingly, for generating the maximum efficiency, in a usual micro wind power generator, power generation performance on a power generator side is synchronized such that a predetermined resistance torque is inputted to the windmill for every acquired rotational speed.

On the other hand, on a power generator side, there exists a circumstance where, when a value of an electric current which flows into a load is changed, a generation torque differs even at the same rotational speed whereby a resistance torque cannot be determined flexibly corresponding to an output load.

SUMMARY OF THE INVENTION

Technical drawbacks in the prior art include the following:

(1) However, in such a conventionally known PROVEN windmill, a hinge is mounted on a blade mounting portion of the windmill so that a flap angle is given to a blade of the windmill whereby the blade of the windmill bends before the wind. However, it is impossible to acquire a rotational speed or a torque at which favorable power generation efficiency is acquired when a wind speed is low.

Figure 13:
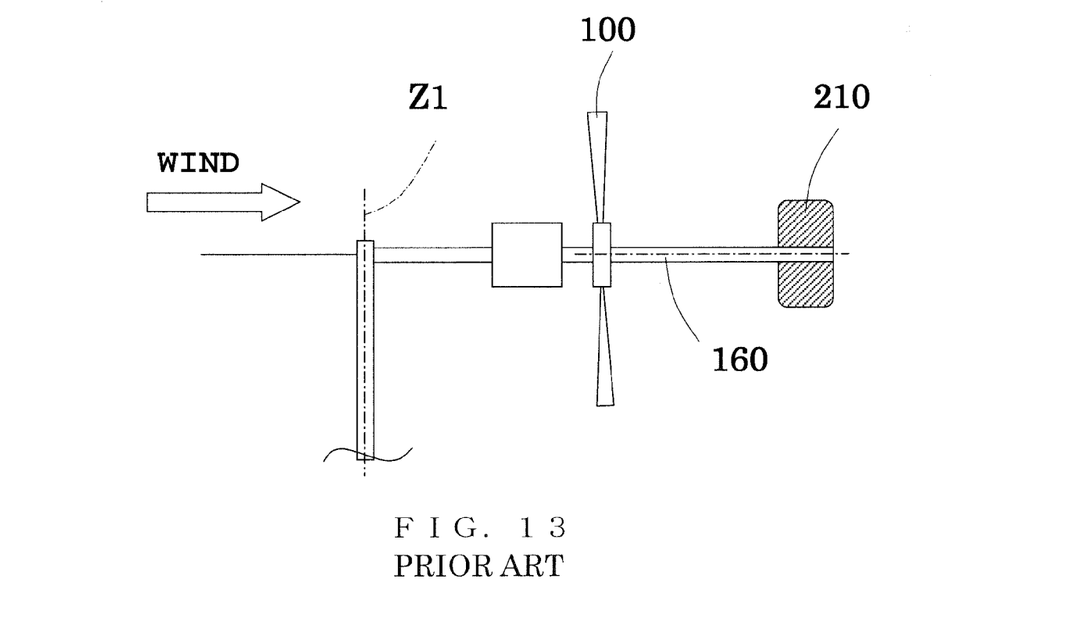
FIG. 13 is an explanatory view of an example of a weathercock stabilizing device used in the conventional downwind method.

(2) Further, as a measure for increasing the weathercock stability of a downwind-type small-sized windmill, as shown in FIG. 13, there has been known a method where a weathercock stabilizing plate 210 is mounted on a rotary shaft 160 of a windmill blade 100. However, the structure of the windmill becomes complicated to prevent the weathercock stabilizing plate 210 from being rotated coaxially with the windmill blade 100 and hence, a manufacturing cost is pushed up although the windmill is a small-sized windmill.

Although it may be possible to provide the structure where the weathercock stabilizing plate 210 and the windmill blade 100 are rotated coaxially, the weathercock stabilizing plate 210 which is rotated downstream of the windmill blade 100 is not favorable aerodynamically.

Eventually, in the downwind type propeller windmill for a small-sized power generator, it is unrealistic to arrange a weathercock stabilizing plate downstream of a windmill blade. Accordingly, as a method for enhancing the weathercock stability, there have been no methods other than a method where a power generator case is elongated so that the center of a wind pressure is positioned as remote as possible from a yaw direction rotary axis and a method where a large direction stabilizing plate is provided in the vicinity of a power generator case.

As a method which exhibits a stable weathercock effect without adversely influencing an aerodynamic effect while coaxially rotating a weathercock stabilizing plate with a windmill blade besides the structure provided with the direction stabilizing plate, it may be possible to provide a method where a simple and light-weighted cylindrical body arranged downstream of the windmill blade.

However, the cylindrical body has a circular cross section and hence, the resistance generated when the cylindrical body receives a wind from a just lateral side is small whereby the sufficient weathercock stability cannot be ensured. To acquire the weathercock stability, it is necessary to increase a diameter of the cylindrical body or to increase a length of the cylindrical body, However, there have been drawbacks that, when the diameter of the cylindrical body is increased, not only the total weight of the cylindrical body is increased but also a back wash vortex is adversely influenced aerodynamically, and when the length of the cylindrical body is increased, the weight of the cylindrical body is increased in the same manner. Further, there also arises an additional drawback that the transportation efficiency of the windmill is deteriorated due to the particular shape of the cylindrical body.

(3) In a conventional micro windmill system, windmill blades and an input shaft of a power generator form an integral fixed pair and hence, a pitch angle of the windmill blade cannot be changed. Accordingly, it is necessary to use the windmill with the pitch angle of the windmill blade preset without taking into account an output load on a power generator side as it is and hence, a loss caused by such combination is never small.

In view of the above-mentioned drawbacks, there has been a demand for technological innovation of a propeller windmill. for a small-sized power generator which can cope with various output loads on a power generator side.

To overcome the above-mentioned drawbacks, the present invention provides the following constitution. That is, the present invention provides a propeller windmill for a small-sized power generator being characterized in that a lateral support strut is rotatably connected to a vertical support strut, a power generator is mounted on the lateral support strut, a base blade configured as a two-wing propeller with each wing formed of a thin-plate-like sheet, the base blade having a symmetrical shape with respect to a rotational axis, is mounted behind the power generator on. a rotary input shaft of the power generator by way of a hub, each wing of the base blade has a corrugated shape such that a cross-sectional shape of each of the wings of the base blade in a direction perpendicular to a direction extending toward a distal end from a proximal end of that wing of the base blade is corrugated, the base blade is exchangeable with a base blade having a different pitch angle or a different length in the direction toward the distal end of each of the wings of the base blade, and a weathercock stabilizing mechanism is arranged behind the base blade coaxially with the base blade, the weathercock stabilizing mechanism being constituted of a cylindrical body which is formed of a thin sheet material and has a front portion thereof closed, and a plurality of cross wind receiving wings which are continuously formed on a rear end of the cylindrical body, and the power generator, the base blades and the weathercock stabilizing mechanism are formed as an integral body in a yawing rotatable manner.

Further, the propeller windmill is also characterized in that the base blade constituted of two blade bodies (each comprising a respective wing of the base blade), and the blade bodies are supported on the hub in a cantilever manner by respective deformable elastic bodies.

The propeller windmill is also characterized in that the blades and the elastic body are formed using paper or plastic.

The propeller windmill is also characterized in that a plurality of the base blades may be mounted on the rotary input shaft of the power generator in symmetry with respect to the rotational axis and arranged in an overlapping manner while keeping a predetermined interval between the base blades.

The present invention also provides a propeller windmill for a small-sized power generator being characterized in that a two-wing propeller-type blade having a symmetrical shape with respect to a rotational axis is used as a base blade, the plurality of base blades are mounted on the rotary input shaft of the power generator in an overlapping manner while keeping a predetermined interval between the base blades, and the base blades are mounted such that an axis in the longitudinal direction of a blade body of each base blade is displaced by a uniform angle in the azimuth direction.

The propeller windmill for a small-sized power generator is also characterized in that a pitch angle of the blade body is capable of being flexibly set.

Further, the propeller windmill for a small-sized power generator being characterized in that the plurality of cross wind receiving wings are formed into a reverse hooked cruciform cross section or a hooked cruciform cross section.

Further, the propeller windmill for a small-sized power generator being characterized in that the cylindrical body which has the front portion thereof closed is detachably connected to a rear end of the rotary input shaft of the generator.

Advantages of the present invention include the following;

(1) The propeller windmill for a small-sized power generator according to the present invention includes the blades having a corrugated wing shape such that the blade is supported in a cantilever manner by way of the elastic body. Accordingly, based on the aerodynamic characteristic of the blade having a corrugated wing shape, the aerodynamic performance (lift-drag ratio) of the blade when a wind speed is low and a rotational speed is low, that is, in a low Reynolds number region can be largely enhanced and, at the same time, the propeller windmill can be made extremely small-sized and light-weighted.

Accordingly, the rotation starting property of the windmill when a wind speed is low can be largely enhanced and hence, the power generation efficiency of the windmill when a wind speed is low can be largely enhanced.

That is, in the present invention, the elastic body which supports the blade having a corrugated wing shape in a cantilever manner can be largely elastically deformed. Accordingly, when a strong wind blows, the elastic deformation of the elastic body imparts a large flap angle to the blade haying a corrugated wing shape and hence, breaking of the windmill when a strong wind blows can be prevented.

(2) According to the present invention, the blades can be formed using plastic which is as thin as paper and hence, the blades can be manufactured at a low cost. Accordingly, the base blades can be manufactured in the form of module and hence, a large number of modules including modules of types having different pitch angles can be prepared as blades to be used for one power generator.

Further, assuming that the base modules are formed of base blades of two-wing propeller type in left and right symmetry, by overlapping the base modules with each other coaxially with the power generator and by fixing the base modules to the rotary input shaft of the power generator with a uniform azimuth angle, it is possible to form the windmill which conforms to the direction of a wind and strength of the wind which are changed corresponding to an environment and, further, the number of overlapping and azimuth angles of the base blades which constitute the base modules can be changed corresponding to an output load of the power generator thus giving rise to an advantageous effect that an efficient propeller windmill for a small-sized power generator can be provided.

For example, by combining two kinds of non-twisted base blades, that is, four base blades having a pitch angle of 15 degrees at a hub portion and four base blades having a pitch angle of 7.5 degrees at a hub portion to one power generator, it is possible to provide a windmill which is extremely efficient for a change in an output load on a power generator side.

Further, by selectively taking a countermeasure such as the reduction of a pitch angle, the reduction of a diameter of rotation by shortening a length of the blade body or the reduction of the number of base blades, a rotational speed of the windmill against a wind speed can be increased although a generation torque of the windmill is decreased, while by increasing the number of base blades having a deep pitch angle, a generation torque can be increased although a rotational speed is decreased.

In this manner, by combining the base blades having several kinds of patterns which differ in pitch angle and length corresponding to an actual output load state of the power generator, the combination of various base blades which exhibits the maximum of efficiency can be selected. Accordingly, the present invention can acquire an advantageous effect that the application of a propeller windmill for a small-sized power generator which requires a control of a voltage or an electric current corresponding to an output load to a conventional windmill for a small-sized power generator which aims at the generation of power by making use of a windmill can be expanded.

Further, for example, by setting a diameter of the base blade large and by setting a pitch angle of the base blade to 7.5 degrees with respect to 1 set of base blades, and by setting a diameter of the base blade small and by setting a pitch angle of the base blade to 15 degrees and by setting a length of the base blade to approximately/2;3 of a length of the base blade having the pitch angle of 7.5 degrees by cutting a distal end of the blade with respect to the other 1 set of base blades, and by arranging the base blades having deep pitch angles on a windward side, the present invention can acquire an advantageous effect that the windmill can acquire a predetermined rotational speed and a predetermined torque equivalent to a rotational speed and a torque acquired by the twisting blades without twisting the blades which pushes up a manufacturing cost to the maximum level in the manufacture of the blades of a windmill.

(3) According to the present invention, the base blades are mounted on the rotary input shaft of the power generator such that the base blades are positioned behind the power generator, and the power generator, the base blades and the weathercock stabilizing mechanism are formed as an integral body in a yawing rotatable manner. Accordingly, the present invention can acquire an advantageous effect that the propeller windmill for a small-sized power generator can be realized with a weight with which a load is hardly applied to the windmill formed of the base blades in the form of weight.

Further, by forming the cylindrical body of the weathercock stabilizing mechanism into the above-mentioned constitution, the present invention can acquire an advantageous effect that the flow of a wind from the base blade is not disturbed and, further, the cylindrical body also functions as a support boom which supports the cross wind receiving wing which performs a weathercock function at a position downstream of and away from the base blade.

The present invention can acquire an advantageous effect that the cylindrical body per se also has a weathercock function by having the above-mentioned constitution.

Further, by setting a wing width of the wing having an approximately cruciform cross section, that is, a diameter of a rotational locus of the wing having an approximately cruciform cross section to a value equal to or less than a diameter of the cylindrical body, the windmill can exhibit an excellent weathercock stabilizing effect as a whole in addition to a weathercock stabilizing function of the cylindrical body.

Further, the wing is formed into a reverse hooked cruciform cross section or a hooked cruciform cross section by bending side edge portions of the wing having an approximately cruciform cross section and hence, the wing exhibits a different manner and operation of the flow of a wind when the wing receives a cross wind compared to a wing simply having an approximately cruciform cross section. That is, an amount of chance in momentum around the shaft differs between both sides of the rotary shaft and hence, the wing has an advantageous effect that a moment which intends to rotate the base blade in the normal direction about the rotary shaft is generated.

Further, although the base blade has no axial rotational moment for a cross wind, by applying bending to side edges of the wing having an approximately cruciform cross section, the wing has an advantageous effect that a rotational starting torque can be imparted to the base blade when a cross wind blows.

Further, by detachably connecting the cylindrical body having the front portion thereof closed to the rear end of the rotary input shaft of the power generator, that is, the hub of the base blades, it is possible to obtain advantageous effects that a weathercock effect can be increased by connecting the cylindrical body when necessary, and in an environment where a sufficient windmill function can be acquired only with the use of the base blades, by removing the cylindrical body, a rotational torque of the base blade can be increased or a rotational speed of the base blade can be increased by an amount that the cylindrical body is removed.

DETAILED DESCRIPTION OF THE INVENTION

The present invention relates to a propeller windmill for a small-sized power generator being characterized in that a lateral support strut is rotatably connected to a vertical support strut, a power generator is mounted on the lateral support strut, blades formed of a thin-plate-like sheet are mounted on an rotary input shaft of the power generator in symmetry with respect to a rotational axis by way of a hub, the blade has a corrugated wing shape, and the blade is exchangeable with a blade having a different pitch angle or a different length in the direction toward a distal end of the blade.

The blade having a corrugated wing shape is supported on the hub by way of a deformable elastic body in a cantilever manner, and the blade having a corrugated wing shape and the elastic body are formed using paper or plastic.

A plurality of the blades which are mounted on the rotary input shaft of the generator in symmetry with respect to a rotational axis and have a corrugated wing shape are combined in an overlapping manner while keeping a predetermined interval between the blades.

Further, a two-wing-propeller-type blade having a symmetrical shape with respect to a rotational axis is used as a base blade, the plurality of base blades are mounted on the rotary input shaft of the small-sized power generator in an overlapping manner while keeping a predetermined interval between the base blades, and the base blades are mounted such that an axis in the longitudinal direction of a blade body of each base blade is displaced by a uniform angle in the azimuth direction.

A pitch angle of the blade body is capable of being flexibly set by exchanging the basic blade.

The basic blades are mounted on the rotary input shaft of the power generator such that the basic blades are positioned behind the power generator. A weathercock stabilizing mechanism is detachably mounted on a rear end of the rotary input shaft of the rower generator, that is, on a back surface of the hub of the basic blade. The weathercock stabilizing mechanism is constituted of: a cylindrical body which is formed of a thin sheet-like material and has a front portion thereof closed; and a plurality of cross wind receiving wings which are mounted on a rear end of the cylindrical body in a projecting manner.

Further, the generator, the base blades and the cylindrical body are formed as an integral body in a yaw-rotatable manner about the vertical support strut.

A cross wind receiving wing is formed into a reverse hooked cruciform cross section or a. hooked cruciform cross section.

The cylindrical body which has the front portion thereof closed is connected to the power generator in a detachable manner by way of a pour opening portion of a PET bottle by making the pour opening portion of a cylindrical body of the PET bottle threadedly engageable with a rear end of the rotary input shaft of the power generator, to be in more detail, with a lid body of the PET bottle which is fixed to a back surface of the hub.

Hereinafter, an embodiment of the present invention is explained in detail.

Figure 1:
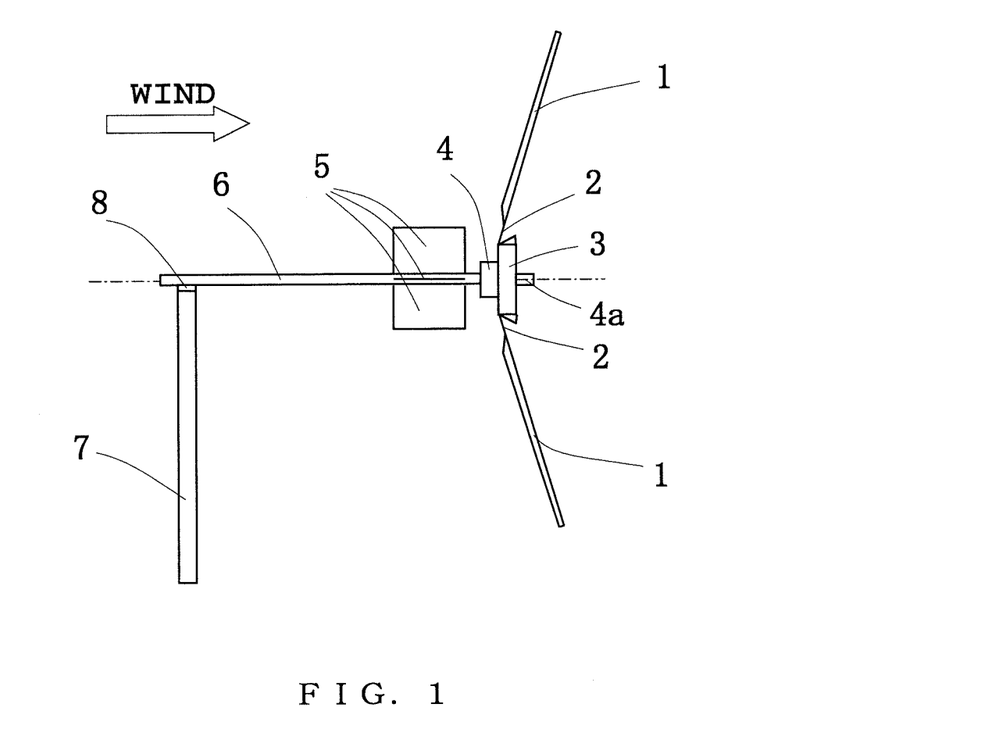
FIG. 1 is an explanatory side view of a propeller windmill for a small-sized power generator according to the present invention.

FIG. 1 is an explanatory side view of a downwind-type propeller windmill for a small-sized power generator where a radius of rotation of the blade is set to 22 cm at maximum.

Two blades 1 made of Kent paper having a corrugated wing shape shown in FIG. 1 are respectively fixed by adhesion to two sheets of thin plates (elastic bodies 2) made of Kent paper. The elastic bodies 2 formed of the Kent-paper-made thin plate are fixed by adhesion to a hub 3 made of Kent paper in the same manner as the elastic bodies 2. That is, the blade 1 are fixed to the hub 3 in a state where the blades 1 are supported in a cantilever manner by the elastic bodes 2 formed of the Kent-paper-made thin plate. The hub 3 made of Kent paper shown in FIG. 1 is directly fixed to a rotary input shaft 4a of a power generator 4 which is an ultra small-sized power generator. The power generator 4 is connected and fixed to one end of a lateral support strut 6 made of steel and having a columnar rod shape The lateral support strut 6 is mounted on a distal end of a vertical support strut 7 made of steel and having a columnar rod shape by way of a rotary support portion 8 formed of a bearing in a state where the lateral support strut 6 is horizontally rotatable. Weathercock stabilizing plates 5 are mounted on side surfaces of the lateral support strut 6 in the extending direction of the lateral support strut 6. In this manner, a downwind-type windmill is formed as a whole by the above-mentioned constitution.

Figure 2:
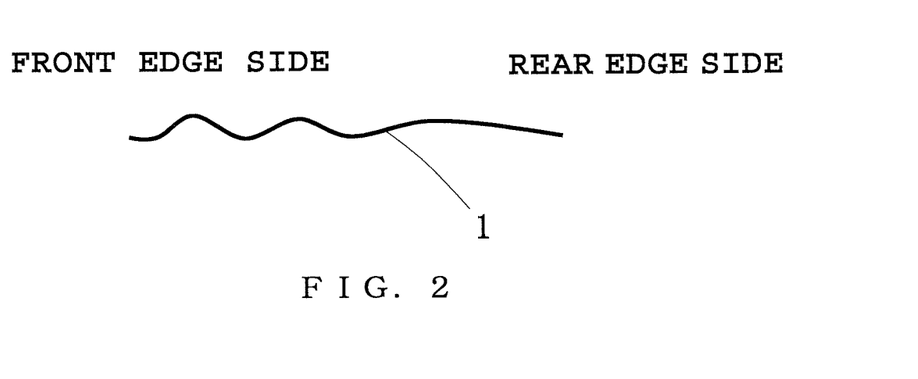
FIG. 2 is an explanatory view showing a corrugated wing shape which a blade of the propeller windmill for a small-sized power generator according to the present invention has.

The blade 1 of the propeller windmill for a small-sized power generator described in this embodiment has a corrugated wing shape as shown in FIG. 2.

Inventors of the present invention have found the aerodynamic performance (lift-drag ratio) of a corrugated wing shape by studying in detail a wing shape of a wing of a dragon fly which flies in a low-Reynolds-number region. That is, the inventors of the present invention have found that the corrugated wing shape has a tendency that the corrugated wing shape exhibits the aerodynamic performance (lift-drag ratio) which far exceeds the aerodynamic performance of other wing shapes in a region where a chord length Reynolds number is in a region at the order of 3 powers of 10 or below, while the aerodynamic performance (lift-drag ratio) is rapidly lowered in a region where the chord length Reynolds number exceeds 4 powers of 10. It is safe to say that such a tendency is observed in common among all corrugated wing shapes having an arbitrary concave and convex shape. According, the propeller windmill for a small-sized power generator described in this embodiment is constituted based on the excellent aerodynamic performance (lift-drag ratio) of the corrugated wing shape in the low Reynolds number region. Further, the propeller windmill for a small-sized power generator described in this embodiment is constituted based on an advantageous effect that a moment of inertia can be largely reduced by the blades 1, the elastic bodies 2 and the hub 3 made of light-weighted Kent paper shown in FIG. 1.

On the other hand., when a strong wind blows, with the increase of the chord length Reynolds number, in the propeller windmill for a small-sized power generator described in this embodiment, the aerodynamic performance (lift-drag ratio) of the blade having a corrugated wing shape is rapidly lowered.

Figure 3A:
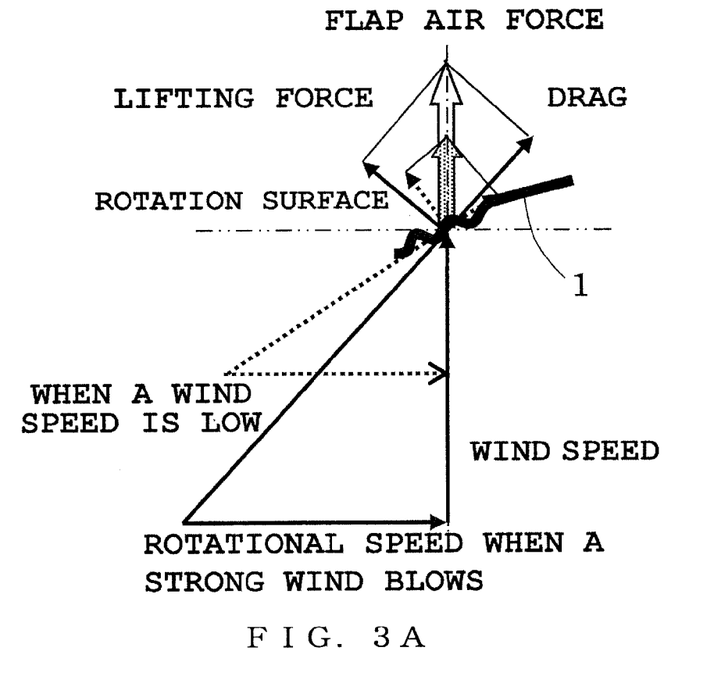
FIG. 3A is an explanatory view showing the balance among forces which act on the blade of the propeller windmill for a small-sized power generator according to the present invention.

Accordingly, as can he understood from the propeller windmill of this embodiment shown in FIG. 3A, a "lifting force" which acts on the blade 1 having a corrugated wing shape becomes small compared to a "drag" which acts on the blade 1 in the same manner so that a "rotational force" of the windmill can be lowered eventually.

That is, it is possible to prevent breaking of the windmill by severing the proportional relationship between a wind speed and a rotational speed of the windmill when a strong wind blows.

Figure 3B:
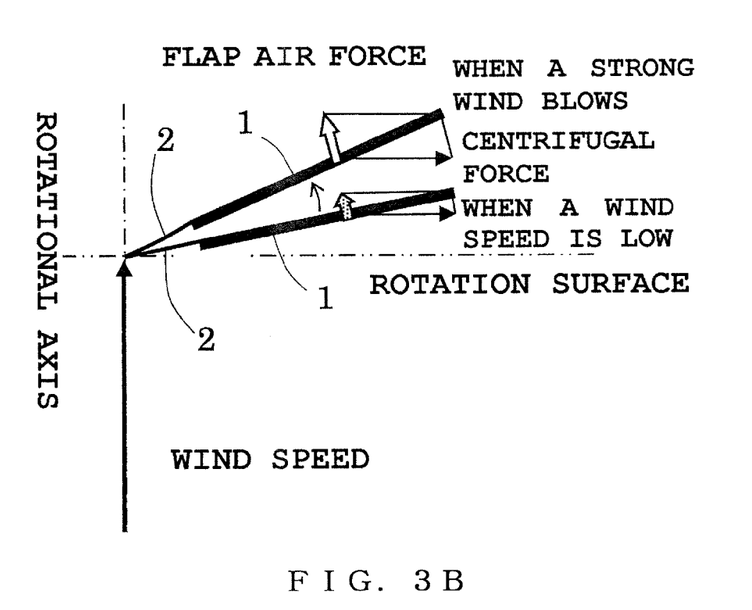
FIG. 3B is an explanatory view showing the balance among forces which act on the blade of the propeller windmill for a small sized power generator according to the present invention.

Further, when a strong wind blows, although an increase rate of the lifting force which acts on the blade 1 having a corrugated wing shape shown in FIG. 3A is lowered, an increase rate of a flap air force which acts on the blade 1 is rapidly increased. Accordingly, as shown in FIG. 3B, a state where a rotational force is acquired by the lifting force which acts on the blade 1 is lowered so that an increase rate of a centrifugal force which acts on the blade 1 is also lowered.

On the other hand, the increase rate of the flap air force which acts on the blade 1 is rapidly increased so that a large bending moment acts on the elastic body 2 which supports the blade 1 in a cantilever manner.

Figure 4:
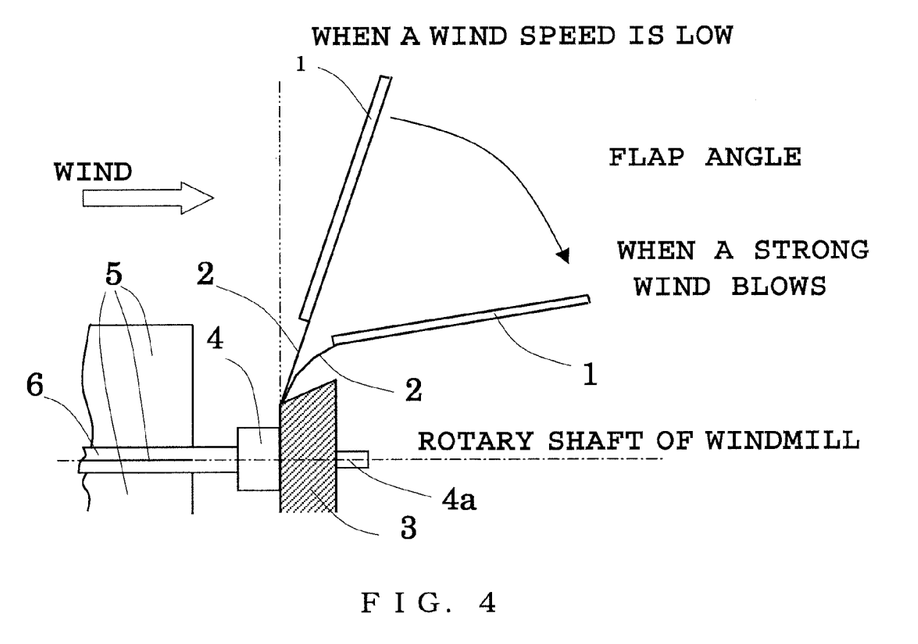
FIG. 4 is an enlarged explanatory view of the propeller windmill for a small-sized power generator according to the present invention as viewed from a side surface of the propeller windmill.

In this manner, the elastic body 2 which supports the blade 1 in a cantilever manner as show in FIG. 4 and is made of Kent paper in this embodiment is elastically deformed and deflected in a flexible manner toward a leeward side so that a flap angle can be imparted to the blade 1. Accordingly, a wind receiving area of the windmill can be effectively reduced so that it is possible to let a wind go apart from the blade 1 when a strong wind blows whereby breaking of the windmill according to this embodiment can be prevented.

Figure 5:
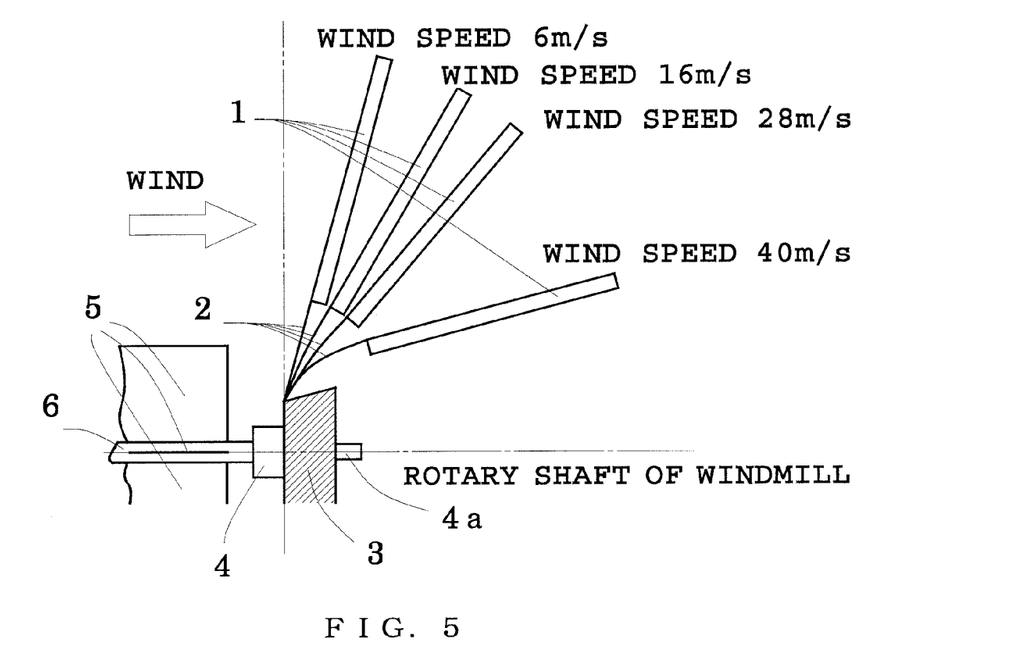
FIG. 5 is an explanatory view showing a result of a wind tunnel experiment on the propeller windmill for a small-sized power generator according to the present invention as viewed from a side surface of the propeller windmill.

FIG. 5 is an explanatory side view showing a result of a wind tunnel experiment where the propeller windmill according to this embodiment is rotated in the inside of a wind tunnel. A twisting angle of the blade 1 of the propeller windmill is set to 0 degree and a pitch angle of the blade 1 is set to −15 degrees.

In the wind tunnel experiment, it is confirmed that, in a rotational state at a wind speed of 6 m/s shown in FIG. 5, a flap angle is not imparted to the propeller windmill for a small-sized power generator of this embodiment, and a rotational speed of the windmill is increased proportional to a wind speed.

In this wind tunnel experiment, it is also confirmed that, in a region up to a wind speed of 8 m/s, a rotational speed of the small-sized propeller windmill of this embodiment is increased proportional to the wind speed.

It is confirmed that, in a region where the wind speed and the rotational speed of the windmill are proportional to each other, the propeller windmill for a small-sized power generator of this embodiment can generate a large lifting force extremely efficiently based on the excellent aerodynamic performance (lift-drag ratio) of the blade 1 having a corrugated wing shape.

Further, it is possible. to impart a large rotational force (rotational torque) to the propeller windmill for a small-sized power generator of this embodiment extremely efficiently.

Accordingly, the propeller windmill for a small-sized power generator of this embodiment can perform the wind power generation suitably by converting a wind power into electric power more efficiently than conventional propeller windmills.

On the other hand, when a wind speed exceeds 8 m/s, the aerodynamic performance (lift-drag ratio) of a corrugated wing shape which the blade 1 has is rapidly lowered so that it is possible to prevent a phenomenon that a rotational speed of the windmill is increased proportional to a wind speed. Further, as shown in FIG. 5, the elastic body 2 which supports the blade 1 in a cantilever manner and is formed of a Kent-paper-made thin plate is elastically deformed and deflected. Accordingly, it is possible to make the blade 1 wave with a wind and it is also possible to let a strong wind go apart from the blade 1 in such a manner that a large flap angle is started to he imparted to the blade 1 at a wind speed of 16 m/s, the flap angle exceeds 45 degrees at the wind speed of 28 m/s, and the flap angle reaches 75 degrees at the wind speed of 40 m/s which is the maximum experimental wind speed of the wind tunnel. In this manner, there is no possibility that the propeller windmill for a small-sized power generator of this embodiment is broken.

Figure 6:
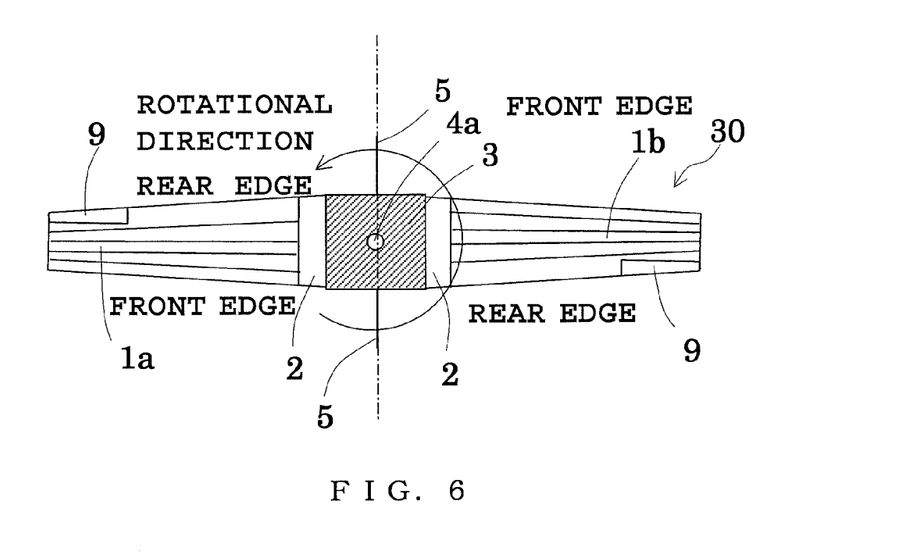
FIG. 6 is an explanatory view of the propeller windmill for a small-sized power generator according to the present invention as viewed from a leeward side of the propeller windmill.

For more flexibly adjusting the aerodynamic performance (lift-drag ratio) of the blade which the propeller windmill for a small-sized power generator of this embodiment has, as shown in FIG. 6, a weight 9 for adjusting an angle of attack which is formed of a paper-made adhesive tape is adhered to a rear edge portion of a distal end of the blade 1 thus adjusting the weight of each blade 1.

By adhering the weight 9 to the blade 1, in the rotation of the windmill when a strong wind which imparts a flap angle to the blade 1 blows, the rear edge portion of the distal end of the blade 1 can be pulled down toward a windward side by a component force in the windward direction generated by the flap angle and hence, the weight 9 can exhibit the same function as applying of twisting to the blade 1, and also an angle of attack of the blade 1 can be increased at a distal end portion of the blade 1.

That is, twisting can be imparted to the blade 1 by twisting a wing surface of the blade 1 and hence, it is possible to prevent breaking of the windmill by flexibly changing and controlling an angle of attack of the blade 1 and a stall condition of the blade 1 when a strong wind blows.

The propeller windmill for a small-sized power generator of this embodiment described above is small-sized and light-weighted and. hence, the propeller windmill can be easily installed anywhere without selecting a place, and can make use of wind power when a wind speed is low which cannot be utilized in wind power generation conventionally.

Further, in addition to the advantageous effect that the power generation can be continued without breaking the windmill even when a strong wind blows, even in a state where the blades are rotated at a high speed when a strong wind blows, the blades and the like are made of paper and hence, there is no possibility that the blades and the like cause dangers to the surrounding, and it is also possible to suppress an environmental burden which is considered necessary for the manufacture of the windmill as low as possible.

Figure 7:
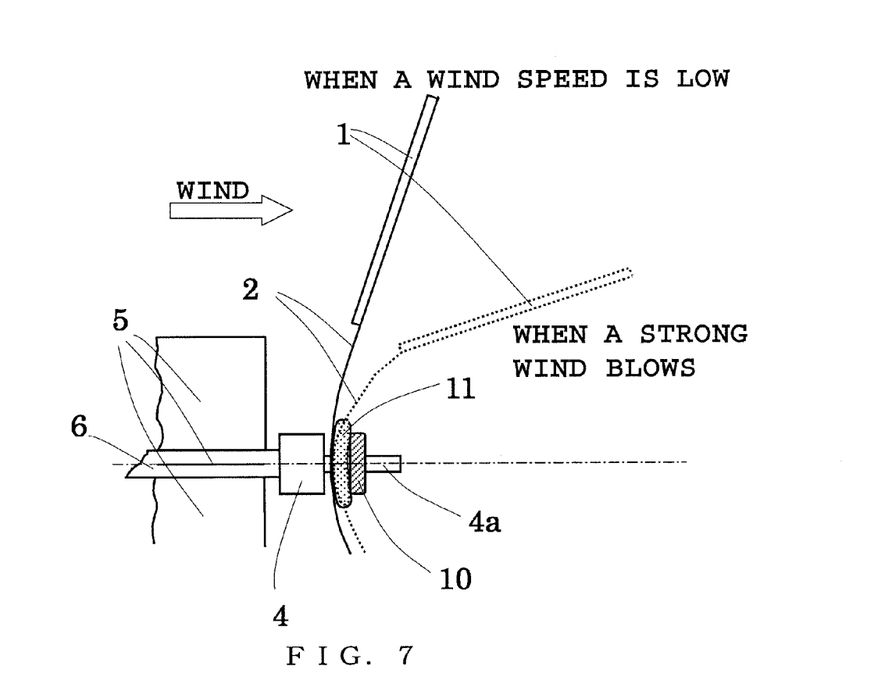
FIG. 7 is an enlarged explanatory view of the propeller windmill for a small-sized power generator according to the present invention as viewed from a side surface of the propeller windmill.

In FIG. 7, symbol 10 indicates a stopper having a circular columnar shape and made of steel, and is integrally fixed to the rotary input shaft 4a of the power generator 4. Symbol 11 indicates a liner made of urethane rubber.

Further, a plurality of blades having a corrugated wing shape which are mounted on the rotary input shaft of the power generator in an axial symmetry are combined in an overlapping manner while keeping a predetermined interval between the blades.

A two-wing propeller-type blade having a symmetrical shape with respect to a rotational axis is used as a base blade, a plurality of base blades are mounted on the rotary input shaft of the small-sized power generator in an overlapping manner while keeping a predetermined interval between the base blades, and the base blades are mounted such that an axis in the longitudinal direction of a blade body of each base blade is displaced by a uniform angle in the azimuth direction. Further, the base blade is formed such that a pitch angle of the blade body is capable of being flexibly set.

Figure 8:
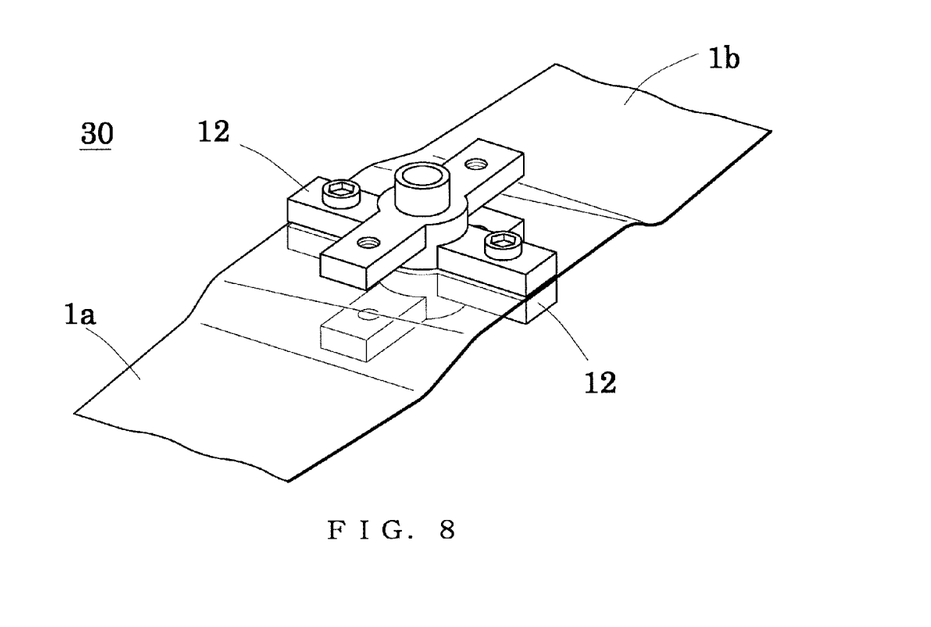
FIG. 8 is an explanatory view of a metal bracket mounting portion of the blade of the propeller windmill for a small-sized power generator according to the present invention.

That is, as shown in FIG. 6, the two-wing propeller-type blade having a symmetrical shape with respect to a rotational axis is used as the base blade 30, and the base blade 30 is constituted of two blade bodies 1a, 1b. That is, as shown in FIG. 8, proximal end portions of two respective blade bodies 1a, 1b are sandwiched between two sheets of metal brackets 12 which are detachably mounted on the rotary input shaft 4a of the power generator in a state where the proximal end portions face each other in an opposed manner, and are threadedly fixed to the rotary input shaft 4a by bolts so that the base blade 30 of two-wing propeller type having a symmetrical shape with respect to a rotational axis is completed. In place of forming the base blade 30 by combining two sheets of blade bodies 1a, 1b, the base blade 30 may be formed by integral molding.

The plurality of base blades 30 of two-wing propeller type are combined in an overlapping manner while keeping a predetermined interval between the base blades. That is, the base blade 30 of two-wing propeller type is fitted on the rotary input shaft of the power generator by making use of the metal brackets 12 at the center of the base blade 30, and the plurality of base blades 30 are combined in an overlapping manner while keeping a predetermined interval between the base blades using a thickness of the metal brackets 12 as a spacer. Further, the base blades are mounted such that an axis in the longitudinal direction of a blade body of each base blade is displaced by a uniform angle in the azimuth direction.

The proximal end portions of the respective blade bodies which are sandwiched between the metal brackets 12 are twisted by a predetermined amount so that a pitch angle is imparted to the base blade. Further, to acquire a predetermined rotational speed and a predetermined torque, for example, the base blades having two kinds of pitch angles of 15 degrees and 7.5 degrees are prepared. By changing the number of base blades, the order of overlapping or the like, the optimum combination of the base blades corresponding to the direction and strength of a wind can be realized thus providing the propeller windmill with high power generation efficiency corresponding to a change in an output load. In this manner, by preparing several kinds of base blades which differ in pitch angle in advance such that a pitch angle can be flexibly changed, it is possible to provide the optimum windmill corresponding to an output load of a small-sized power generator.

Figure 9:
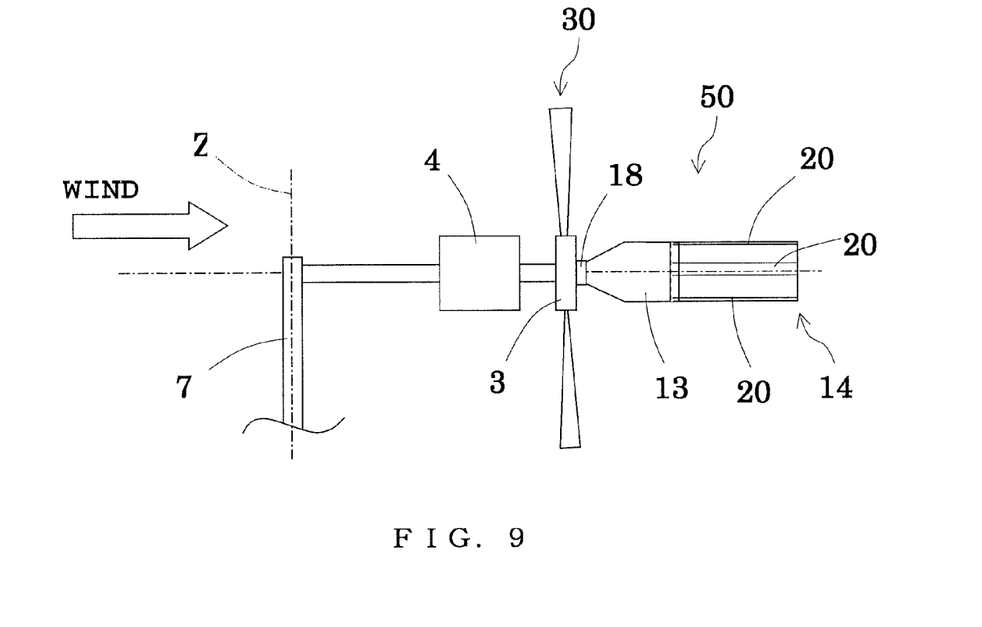
FIG. 9 is an explanatory side view of a propeller windmill for a small-sized power generator on which a weathercock stabilizing mechanism according to the present invention is mounted.

Further, as shown in FIG. 9, a weathercock stabilizing mechanism 50 is detachably mounted on a rear side of the hub 3. The weathercock stabilizing mechanism 50 is constituted of a cylindrical body 13 and a plurality of cross wind receiving wings 20 which are continuously formed on a rear end of the cylindrical body 13, wherein a cross-sectional area of the cylindrical body 13 is set approximately equal to a cross-sectional area of the hub. In the drawing, symbol 4 indicates a power generator, and symbol Z indicates a yaw axis.

The cylindrical body 13 can be threadedly engaged with a lid body 18 of a PET bottle made of a thin sheet-like material which is fixedly mounted on the hub 3 at the center of the base blade 30 by making use of threads formed on a pour opening portion of the PET bottle.

By forming the cylindrical body 13 which constitutes the weathercock stabilizing mechanism 50 in such a manner, the flow of a wind from the base blade 30 is not disturbed. Further, the cylindrical body 13 can also function as a support boom which supports the cross-wind receiving wings 20 which are positioned downstream of and away from the base blade 30 by the rear end thereof and perform a weathercock function.

Further, the cylindrical body 13 per se has a weathercock effect to some extent and hence, this cylindrical shape provides the most efficient weathercock structure.

A plurality of cross-wind receiving wings 20 which are mounted on the rear end of the cylindrical body 13 and have a weathercock function are formed using a thin sheet-like material in the same manner as the PET bottle, have the structure where rectangular wings are radially mounted forming an approximately cruciform cross section, Due to such a constitution, the cross-wind receiving wings 20 are light-weighted, can withstand a strong wind, and do not sacrifice the performance of the base blade 30 while exhibiting a sufficient weathercock function. Depending on a condition, the following design. conditions may be adopted for enhancing the windmill performance.

That is, when a wing width of the wing 14 formed of the plurality of cross-wind receiving wings 20 and having an approximately cruciform cross section is larger than a diameter of the cylindrical body 13 in front of the wing 14, a distal end portion of the wing 14 having an approximately cruciform cross section is exposed in the flow behind the base blade 30 so that setting of the wind width of the wing 14 to such a size is not desirable in view of the aerodynamic resistance. Accordingly, by setting the wing width of the wing 14 having an approximately cruciform cross section, that is, a diameter of a rotary locus of the wing 14 having an approximately cruciform cross section to a diameter of the cylindrical body 13 or less, it is possible to acquire a more excellent weathercock stabilizing effect than a case where a weathercock stabilizing effect resorts to only the cylindrical body 13.

Further, side edges of the cruciform wing are bent at an approximately right jangle by forming such a wing 14 having an approximately cruciform cross section.

The bending direction is the direction that the bent portion receives a cross wind when the windmill receives the cross wind so that a rotational moment is imparted to the base blade 30 in the predetermined rotational direction of the base blade 30.

When such bending is applied, the shape of the wing 14 having an approximately cruciform cross section becomes a reverse hooked cruciform or a hooked cruciform in cross section eventually.

Figure 10A:
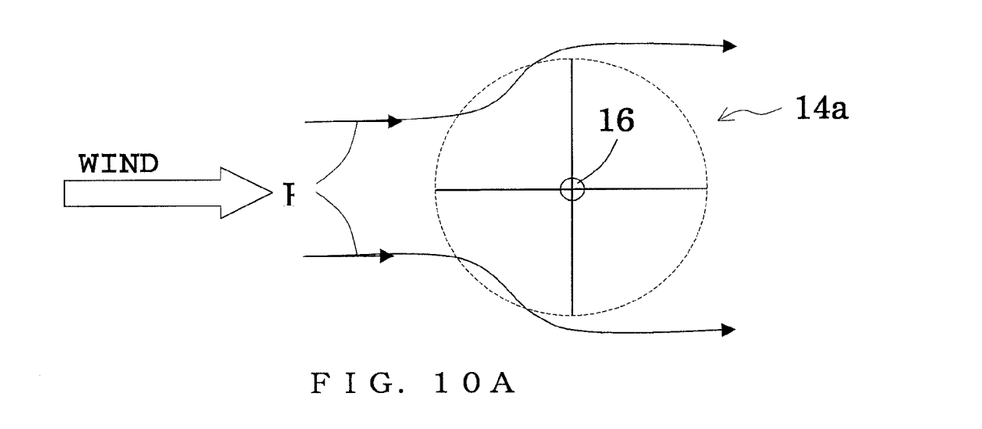
FIG. 10A is an explanatory view for explaining a cross wind effect of a cross wind receiving wing of the weathercock stabilizing mechanism according to the present invention.
Figure 10B:
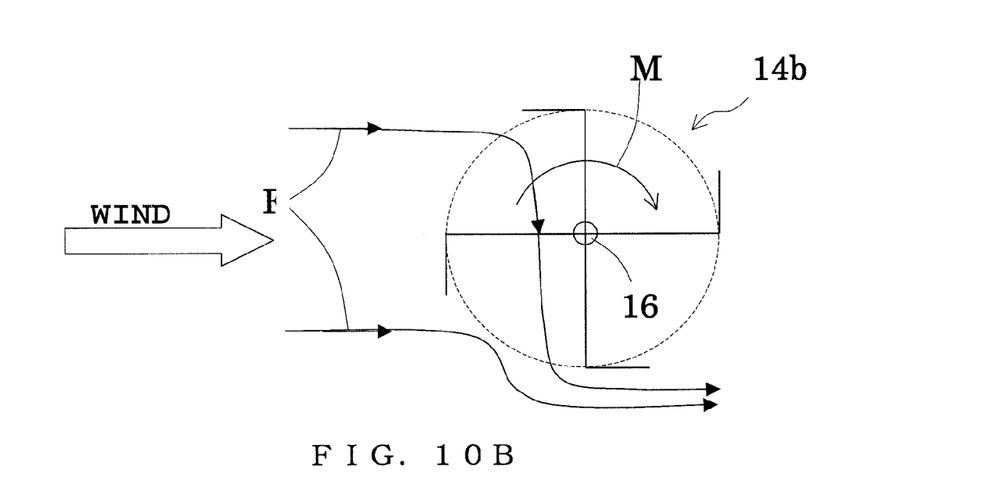
FIG. 10B is an explanatory view for explaining the cross wind effect of the cross wind receiving wing of the weathercock stabilizing mechanism according to the present invention.

To compare the wing where bending is applied to side edges of the wing 14 having approximately cruciform cross section as described above and the wing to which such bending is not applied, as shown in FIG. 10A and FIG. 10B, these two wings, 14a and 14b, respectively, differ from each other with respect to the manner and operation of the flow F of air when the respective wings receive a cross wind.

The wing 14a having a cruciform cross section to which bending is not applied exhibits smaller resistance against a cross wind since a weir air amount is small and hence, as a matter of course, the wing 14a having a cruciform cross section exhibits a smaller generation. amount of moment which is generated when a cross wind blow.

On the other hand, with respect to the wing to which bending is applied to side edges of the wing 14 having an approximately cruciform cross section thus having a reverse hooked cruciform or a hooked cruciform in cross section, a change amount in momentum around the axis differs between both sides of the rotary shaft 16 and hence, a moment M around the rotary shaft which intends to rotate the base blade 30 around the rotary shaft 16 in the normal direction is generated. FIG. 10B shows the flow of air of a cross wind and the generated moment M when the wing 14b has a reverse hooked cruciform cross section.

In this manner, although the moment M around the rotary shaft 16 is small, the moment M acts in the normal rotational direction of the base blade 30 and hence, the moment M also contributes to the rotation of the base blade 30 when the base blade 30 is extremely light-weighted.

The base blade 30 basically has no moment M around the rotary shaft for a cross wind and hence, the applying of bending to side edges of the wing 14 having an approximately cruciform cross section becomes an only one technique which can impart a rotational starting torque to the base blade 30 when a cross wind blows.

Accordingly, when the windmill suddenly receives a wind from a side in a non-wind stand still state, in a case where bending is applied to side edges of the wing 14 having an approximately cruciform cross section so that the wing 14 has a reverse hooked cruciform cross section or a hooked cruciform cross section, the base blade 30 receives the moment M around the rotary shaft which. rotates the base blade 30 in the normal rotational direction. Accordingly, when the base blade 30 takes the normal downwind direction, compared to a case where the windmill includes only the base blade 30 or a case where the wing 14a having merely a cruciform cross section is added, the axial rotation of the base blade 30 is raised to some extent. Accordingly, even when a change in wind direction considerably large so that the yaw rotation occurs frequently, the delay of rising of the axial rotation of the base blade 30 can be made small as much as possible, Using the windmill which has the constitution where distal ends of the wing 14 having an approximately cruciform cross section go beyond or project from the outer periphery of the hub 3 at the center of the base blade 30 (when the wind width is larger than the diameter of the cylindrical body 13 in front of the wing 14), an aerodynamic action of the windmill when the wing 14 having an approximately cruciform cross section is coaxially rotated by the flow of wind behind the base blade 30 is studied.

That is, when the wing width of the wing 14 having an approximately cruciform cross section is larger than the diameter of the cylindrical body 13 in front of the wing 14, a distal-end locus portion of the wing 14 having an approximately cruciform cross section is exposed in the flow behind the base blade 30 and hence, the aerodynamic interference is generated. Accordingly, such a constitution is not desirable.

In view of the above, by setting the wing width of the wing 14 having an approximately cruciform cross section, that is, the diameter of a rotational locus of the wing 14 having an approximately cruciform cross section equal to or smaller than the diameter of the cylindrical body 13, that is, the diameter of the hub 3, it is possible to acquire a more excellent weathercock stabilizing effect than a case where a weathercock stabilizing effect resorts to only the cylindrical body 13.

However, in a case where a change in wind direction frequent so that a delay in starting response characteristic of the base blade 30 is conspicuous, the starting response characteristic of the base blade 30 can be improved by increasing the wing width of the wing having a reverse hooked cruciform cross section or a hooked cruciform cross section to the outer periphery of the cylindrical body 13.

In the present invention, the wing width of the wing where bending is applied to the wing 14 having an approximately cruciform cross section, that is, the diameter of rotation of the wing 14 having an approximately cruciform cross section should be determined based on a function of a starting response characteristic, a response characteristic of yaw rotation, frequency of change in wind direction and the like of the whole It is needless to say that, when the wing width of the wing 14 having an approximately cruciform cross section to which bending is applied is set to the diameter of the cylindrical body 13 or less, lowering of efficiency at the rear stream portion of the base blade 30 can be ignored.

This is because although a turbulent flow region is held as it is in a region behind the cylindrical body 13 in operation in a downwind state, the flow surrounding the region is slightly rotated in the same direction by being influenced by the rotation of the base blade 30 and hence, the portions of the wing 14 having an approximately cruciform cross section disposed immediately after the cylindrical body 13 has a function of synchronizing and adjusting the turbulent flow with the flow around the turbulent flow whereby it is reasonable to consider that lowering of efficiency is not always generated at the rear stream portion of the base blade 30 according to such characteristics.

Figure 11A:
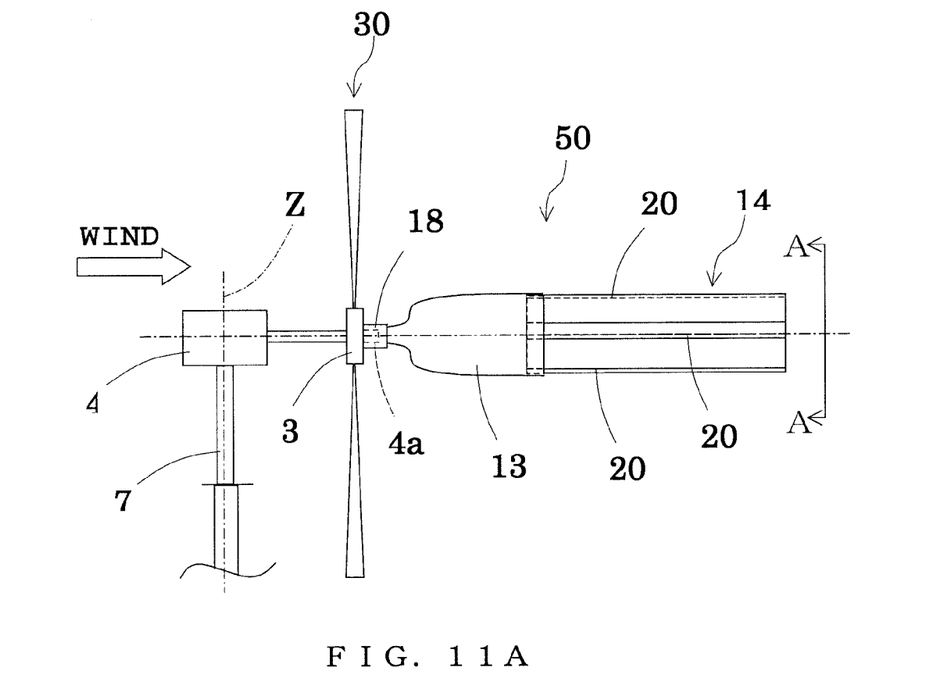
FIG. 11A is an explanatory side view of a propeller windmill for a small-sized power generator on which a cylinder which constitutes a weathercock stabilizing device according to the present invention is mounted.

FIG. 11A is a side view showing the constitution of a downwind-type windmill having a diameter of 42 cm to which the above-mentioned example of the present invention is applied.

A lid body 18 of a PET bottle is connected and fixed to a back surface of a hub 3 of a base blade 30 such that the lid body 18 is positioned on an end portion of an rotary input shaft 4a which penetrates a center portion of the hub 3, and a pour opening of the PET bottle which constitutes a cylindrical body 13 whose bottom portion is opened by cutting is detachably and threadedly engaged with the lid body 18, The PET bottle is configured to have a rotational radius substantially equal to rotational radius of the hub 3. A wing 14 having an approximately cruciform cross section is connected to the opening portion formed by cutting on the bottom portion of the PET bottle which constitutes the cylindrical body 13. When necessary, side edge portions of the wing 14 having an approximately cruciform cross section are bent thus forming the wing 14 having a reverse hooked cruciform cross section or a hooked cruciform cross section.

Figure 11B:
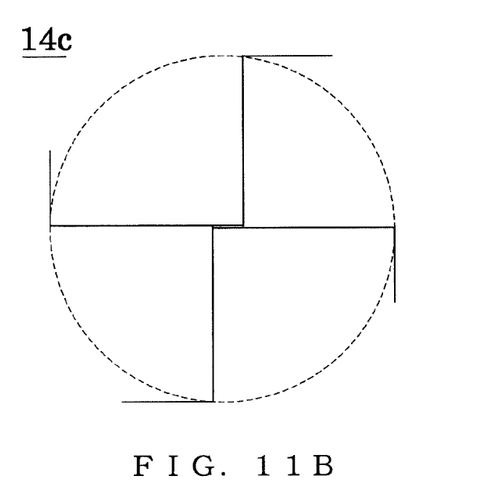
FIG. 11B is a cross-sectional view as viewed in the direction indicated by arrows A-A in FIG. 11A.

FIG. 11B is a view as viewed in the direction indicated by arrows A-A in FIG. 11A, and shows a wing 14c having a hooked cruciform cross section when the wing 14 having an approximately cruciform cross section is formed into a hooked cruciform in cross section. In the case shown in FIG. 11B, the bending direction of side edge portions of the wing 14 having an approximately cruciform cross section is set such that the wing 14 exhibits a hooked cruciform as viewed from a downstream side. This corresponds to a case where the base blade 30 is designed to rotate in the right screw direction at a downwind position as viewed from a downstream side. Naturally, when the rotational direction of the base blade 30 is opposite, the bending direction of the side edge portions of the wing 14 having an approximately cruciform cross section is set such that the wing 14 exhibits an approximately reverse hooked cruciform cross section opposite to the case shown in FIG. 11B.

It is not always necessary to form the wing 14 having an approximately cruciform cross section into a strict cruciform shame. As can be understood from the cross-sectional view as viewed in the direction indicated by arrows A-A, the wing 14 may be formed such that a flat plate is bent at a right angle so as to form an angled member shape, rectangular portions including bent portions are adhered to each other thus forming an approximately cruciform shape and, thereafter, side edge portions of the wing are bent into an angled member shape.

In this embodiment, a diameter of the hub 3 is set to approximately 60 mm and the diameter of the PET bottle is set to approximately 65 mm so that the PET bottle is substantially concealed by the hub 3 of the windmill. A length from the lid body 18 of the PET bottle which constitutes a PET bottle mounting portion to a rear end of the cross wind receiving wing 20 is set to approximately 35 cm. A length of the wing 14 having an approximately cruciform cross section is set to approximately 15 cm so that a mass of only a weathercock stabilizing mechanism. can be suppressed to 30 g or less.

The invention claimed is:

1. A propeller windmill for a small-sized power generator, comprising:
   a lateral support strut rotatably connected to a vertical support strut, a power generator mounted on the lateral support strut;
   a base blade configured as a two-wing propeller with each wing formed of a thin-plate-like sheet, the base blade having a symmetrical shape with respect to a rotational axis and being mounted behind the power generator on a rotary input shaft of the power generator by way of a hub; and
   a windcock stabilizing mechanism;
   wherein the thin-plate-like sheet has a corrugated wing shape such that a cross-sectional shape of each of the wings of the base blade in a direction perpendicular to a direction extending toward a distal end from a proximal end of that wing of the base blade is corrugated, and the base blade is exchangeable with a base blade of a different pitch angle or a different length measured between the proximal end and the distal end of each of the wings of the base blade; and
   wherein the weathercock stabilizing mechanism is arranged behind the base blade coaxially with the base blade, the weathercock stabilizing mechanism is constituted of a cylindrical body which is formed of a thin sheet material and has a front portion thereof closed, and a plurality of cross wind receiving wings which are continuously formed on a rear end of the cylindrical body, and the power generator, the base blade and the weathercock stabilizing mechanism are formed as an integral body in a, yawing rotatable manner.

2. The propeller windmill for a small-sized power generator according to claim 1, wherein each wing of the two-winged propeller comprises a discrete blade body comprising the thin-plate-like sheet having a corrugated wing shape and the propeller windmill further comprises deformable elastic bodies, the blade bodies each being supported cantileveredly on the hub by a respective one of the deformable elastic bodies.

3. The propeller windmill for a small-sized power generator according to claim 2, wherein the blade bodies and the elastic bodies each comprise paper or plastic.

4. The propeller windmill for a small-sized power generator according to claim 1, wherein a plurality of the base blades are mounted on the rotary shaft of the power generator in symmetry with respect to a rotational axis and arranged in an overlapping manner while keeping a predetermined interval between the base blade.

5. The propeller windmill for a small-sized power generator according to claim 2, wherein a plurality of the base blades are mounted on the rotary input shaft of the power generator is symmetry with respect to a rotational axis, are mounted on the rotary input shaft of the power generator in an overlapping manner while keeping a predetermined interval between the base blades, and the base blades are mounted such that an axis in a longitudinal direction of a blade body of each base blade is displaced by a uniform angle in the azimuth direction.

6. The propeller windmill for a small-sized power generator according to claim 2, wherein a pitch angle of the blade body is adjustably settable.

7. The propeller windmill for a small-sized power generator according to claim 1, wherein the plurality of cross wind receiving wings are formed into a reverse hooked cruciform cross section or a hooked cruciform cross section.

8. The propeller windmill for a small-sized power generator according to claim 7, wherein the cylindrical body which as the front portion thereof closed is detachably connected to a rear end of the rotary input shaft of the generator.

* * * * *